United States Patent
Mola

(10) Patent No.: US 10,684,835 B1
(45) Date of Patent: Jun. 16, 2020

(54) IMPROVING EMULATION AND TRACING PERFORMANCE USING COMPILER-GENERATED EMULATION OPTIMIZATION METADATA

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/216,601

(22) Filed: Dec. 11, 2018

(51) Int. Cl.
   *G06F 9/44* (2018.01)
   *G06F 8/41* (2018.01)
   *G06F 11/34* (2006.01)

(52) U.S. Cl.
   CPC .............. *G06F 8/458* (2013.01); *G06F 8/443* (2013.01); *G06F 11/3466* (2013.01)

(58) Field of Classification Search
   None
   See application file for complete search history.

(56) References Cited

U.S. PATENT DOCUMENTS

| | | | |
|---|---|---|---|
| 7,096,322 B1 | 8/2006 | Sollom et al. | |
| 10,268,462 B2 * | 4/2019 | Kunugi | G06F 8/434 |
| 2006/0277231 A1 | 12/2006 | Kral et al. | |
| 2008/0091923 A1 * | 4/2008 | Fulton | G06F 9/30167 |
| | | | 712/211 |
| 2008/0177985 A1 * | 7/2008 | Sandham | G06F 9/45537 |
| | | | 712/220 |
| 2009/0006074 A1 * | 1/2009 | Green | G06F 9/45504 |
| | | | 703/28 |
| 2009/0144733 A1 * | 6/2009 | Oiwa | G06F 9/45558 |
| | | | 718/1 |
| 2012/0131575 A1 * | 5/2012 | Yehuda | G06F 9/45558 |
| | | | 718/1 |
| 2012/0144167 A1 * | 6/2012 | Yates, Jr. | G06F 9/30174 |
| | | | 712/216 |

(Continued)

OTHER PUBLICATIONS

"International Search Report and Written Opinion Issued in PCT Application No. PCT/US19/064091", dated Feb. 20, 2020, 15 Pages.

*Primary Examiner* — Insun Kang
(74) *Attorney, Agent, or Firm* — Workman Nydegger

(57) ABSTRACT

An emulator can use compiler metadata to efficiently emulate execution of executable machine code compiled from the source code. Based on accessing compiler metadata associated with machine code, an emulator can identify behavior(s) of the source code from which the machine code is compiled which are not implied by the machine code. From these behaviors, the emulator can identify emulator optimization(s) that can be applied, during emulation of execution of a thread, to reduce a number of steps needed to emulate execution the machine code, while preserving any externally-visible side-effects. These optimizations can operate to reduce a number of emulator operations needed emulate execution of the machine code, or to elide one or more machine code instructions from emulation. These optimizations can then be applied while emulating execution of the thread. The emulated execution could be recorded to a trace that is equivalent to a trace recorded without these optimizations.

20 Claims, 4 Drawing Sheets

(56) References Cited

U.S. PATENT DOCUMENTS

| | | | |
|---|---|---|---|
| 2012/0198428 A1* | 8/2012 | Schmidt | G06F 8/443 |
| | | | 717/153 |
| 2015/0379169 A1* | 12/2015 | Wu | G06F 9/45508 |
| | | | 703/26 |
| 2017/0068521 A1* | 3/2017 | Bertran Monfort | G06F 9/4887 |
| 2017/0220328 A1* | 8/2017 | Cui | G06F 11/36 |
| 2018/0052667 A1* | 2/2018 | Kunugi | G06F 8/434 |
| 2018/0060213 A1 | 3/2018 | Mola | |
| 2018/0165079 A1* | 6/2018 | Isshiki | G06F 8/53 |
| 2020/0019388 A1* | 1/2020 | Jaeger | G06F 8/4441 |
| 2020/0034276 A1* | 1/2020 | O'Dowd | G06F 11/3648 |
| 2020/0110587 A1 | 4/2020 | Morgan et al. | |

* cited by examiner

IMPROVING EMULATION AND TRACING PERFORMANCE USING COMPILER-GENERATED EMULATION OPTIMIZATION METADATA

BACKGROUND

When developing software applications, developers commonly spend a significant amount of time "debugging" application code to find runtime errors (e.g., undesired behaviors and software crashes) in the code. In doing so, developers may take several approaches to reproduce and locate a source code bug, such as observing behavior of a program based on different inputs, inserting debugging code (e.g., to print variable values, to track branches of execution, etc.), temporarily removing code portions, etc. Tracking down the code that causes a given undesired behavior or software crash can occupy a significant portion of application development time.

Many types of debugging software applications ("debuggers") have been developed in order to assist developers with the code debugging process. These tools offer developers the ability to trace, visualize, and alter the execution of computer code. For example, debuggers may visualize the execution of code instructions, may present memory and register values at various times during code execution, may enable developers to alter code execution paths, and/or may enable developers to set breakpoints that pause application execution and present program state at the time the breakpoint triggers.

An emerging form of debugging applications enable "time travel," "reverse," or "historic" debugging, in which execution of one or more of a program's threads are recorded/traced by tracing software and/or hardware into one or more trace files. Using some tracing techniques, these trace file(s) contain a "bit-accurate" trace of each traced thread's execution, which can be then be used to replay each traced thread's execution later for forward and backward analysis. Using bit-accurate traces, each traced thread's prior execution can be reproduced down to the granularity of its individual machine code instructions.

Some trace recording techniques record a bit-accurate trace based, in part, on recording processor data influxes (e.g., cache misses, uncached reads, etc.) during execution of each traced thread's machine code instructions by the processor. These recorded processor data influxes enable a time travel debugger to later reproduce any memory values that were read by these machine code instructions during replay of a traced thread. While bit-accurate tracing can be achieved via hardware (e.g., by modifying physical processor to assist in recording data influxes to the processor), in many situations it may be advantageous to record bit-accurate traces using binary emulation, which emulates execution of subject code at a software emulator. However, binary emulation adds to the overheads of bit-accurate tracing, which can limit the situations in which bit-accurate traces can realistically be recorded in production environments.

BRIEF SUMMARY

At least some embodiments described herein improve the efficiency of binary emulation. These embodiments leverage compiler-generated emulation optimization metadata that captures higher-level program behaviors that are expressed in source code in order to carry out emulator optimizations while emulating execution of machine code instructions that were generated from that source code. Using knowledge of these higher-level program behaviors, these emulator optimizations can decrease the amount of work that an emulator needs to perform in order to emulate execution of these machine code instructions—while at the same time achieving the equivalent results of having actually executed the machine code instructions at a processor. For example, emulator optimizations might reduce the number of steps needed to emulate execution of one or more machine code instructions (i.e., as compared to executing those instruction(s) at a processor directly), and/or might elide one or more machine code instructions altogether. However, these emulator optimizations preserve externally-visible side-effects of execution of those machine code instructions that are meaningful according to the source code and its language memory model (e.g., such as memory writes that are visible external to the thread for which those instruction(s) were emulated). As such, the embodiments herein can use information that was available to a compiler in source code—but that may not normally be expressly captured in corresponding machine code—to make emulator optimizations that carry out behaviors specified in the source code while avoiding some inefficiencies of emulating the machine code with the same fidelity that a processor would have achieved when executing the machine code.

Embodiments can also record bit-accurate traces while performing binary emulation of machine code that has been augmented with compiler-generated emulation optimization metadata. These bit-accurate traces are equivalent to a bit-accurate trace that would have been recorded based on execution this same machine code directly at a processor. In embodiments, a tracer might also leverage the emulation optimization metadata to further reduce the size of these equivalent bit-accurate traces.

Some embodiments are directed to methods, systems, and computer program products that use metadata that preserves behaviors expressed in source code to efficiently emulate execution of machine code compiled from the source code. Based on accessing compiler metadata associated with executable machine code that executes as part of a thread, these embodiments identify one or more behaviors of the source code from which the machine code is compiled which are not implied by the machine code. Based on the identified one or more behaviors of the source code from which the machine code is compiled, these embodiments identify one or more emulator optimizations that can be applied during emulation of execution of the thread that reduce a number of steps needed to emulate execution of one or more machine code instructions of the machine code, while preserving one or more side-effects that are visible external to the thread. The one or more emulator optimizations include at least one of (i) reducing a number of emulator operations needed emulate execution of the one or more machine code instructions, or (ii) eliding one or more machine code instructions from emulation. While emulating execution of the machine code as part of emulating execution of the thread, the one or more emulator optimizations are applied to at least (i) reduce the number of emulator operations needed emulate execution of the one or more machine code instructions while preserving the one or more side-effects, or (ii) elide the one or more machine code instructions from emulation while preserving the one or more side-effects.

Based at least on emulating execution of the machine code, some embodiments might also record a trace that is usable to replay the emulated execution of the machine code.

This trace is equivalent to a trace that is recorded without applying the one or more emulator optimizations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
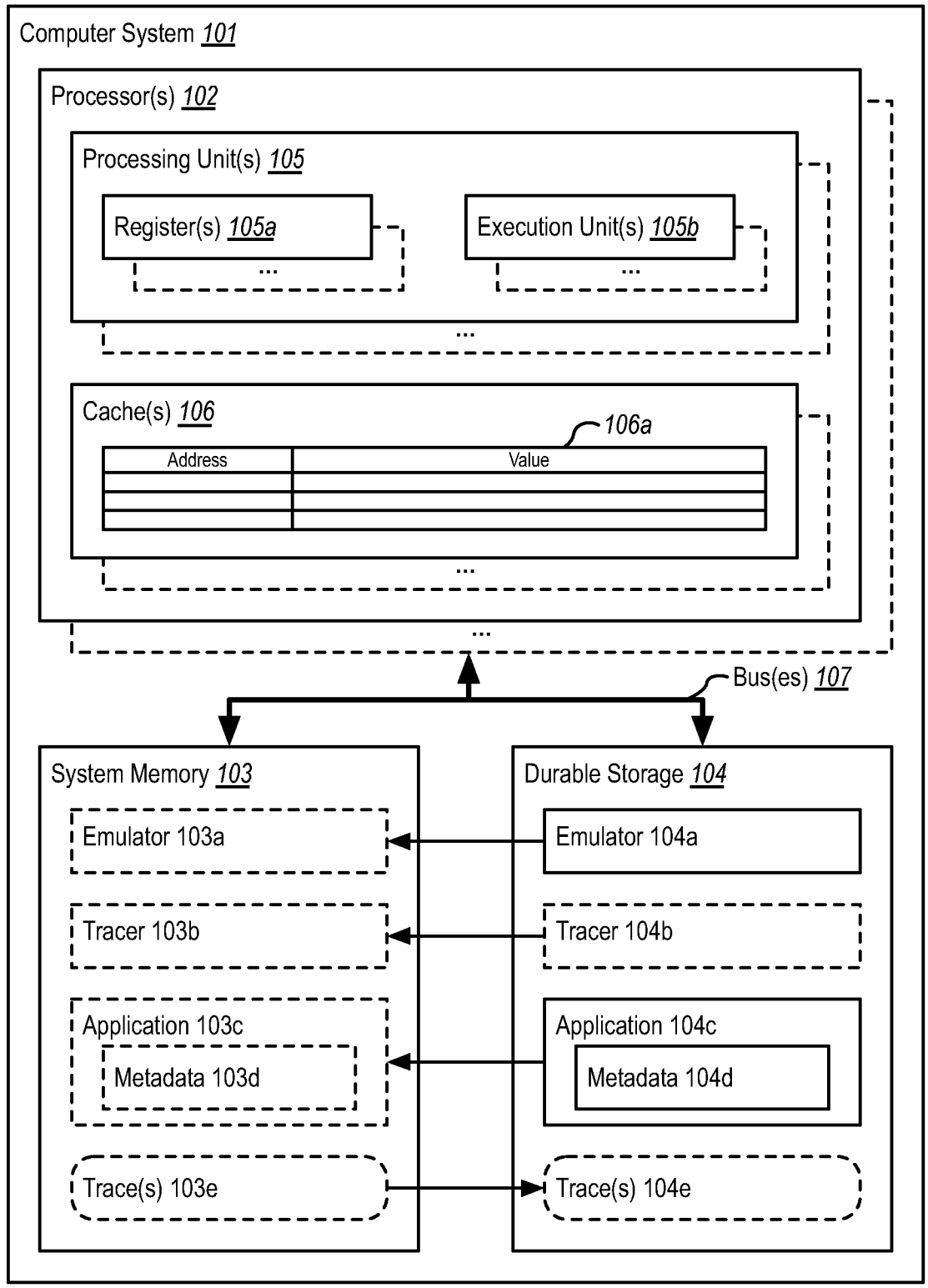
FIG. 1 illustrates an example computer architecture that facilitates using metadata that preserves behaviors expressed in source code to efficiently emulate execution of machine code compiled from the source code, that can also facilitate recording this emulated execution to one or more bit-accurate traces.

At least some embodiments described herein improve the efficiency of binary emulation. These embodiments leverage compiler-generated emulation optimization metadata that captures higher-level program behaviors that are expressed in source code in order to carry out emulator optimizations while emulating execution of machine code instructions that were generated from that source code. Using knowledge of these higher-level program behaviors, these emulator optimizations can decrease the amount of work that an emulator needs to perform in order to emulate execution of these machine code instructions—while at the same time achieving the equivalent results of having actually executed the machine code instructions at a processor. For example, emulator optimizations might reduce the number of steps needed to emulate execution of one or more machine code instructions (i.e., as compared to executing those instruction(s) at a processor directly), and/or might elide one or more machine code instructions altogether. However, these emulator optimizations preserve externally-visible side-effects of execution of those machine code instructions that are meaningful according to the source code and its language memory model (e.g., such as memory writes that are visible external to the thread for which those instruction(s) were emulated). As such, the embodiments herein can use information that was available to a compiler in source code—but that may not normally be expressly captured in corresponding machine code—to make emulator optimizations that carry behaviors specified in the source code while avoiding some inefficiencies of emulating the machine code with the same fidelity that a processor would have achieved when executing the machine code.

In this description and the following claims, achieving the "equivalent results" of executing machine code at a processor while emulating that machine code refers to emulating the machine code in a manner that exhibits behaviors would be legal according to the original source code (i.e., based on the memory model of the programming language of the source code) even if the emulated machine code doesn't actually capture those behaviors. Thus, an emulator that uses the optimizations herein can produce an "equivalent result" when emulating machine code if it emulates behaviors that the compiler could have generated, even if those behaviors were not captured in the actual machine code being emulated. For example, leveraging emulation optimization metadata, an emulator might coalesce reads and/or writes to the same memory location, re-order memory accesses, etc., in a way that the compiler could have, given different compiler implementation choices, different compiler optimization settings, different compile-time restrictions (e.g., availability of registers), etc.

As mentioned, embodiments leverage compiler-generated emulation optimization metadata that captures higher-level program behaviors that are expressed in source code, but which may not be readily identified from the resulting machine code. This emulation optimization metadata can capture any type of information that is available to a compiler at compile time, such as variable dependencies, memory ordering constraints (e.g., memory barriers/fences, acquire/release semantics, etc.), volatility of memory locations, attributes of code sections (e.g., whether a function depends only on its parameters, whether a function relies on aliasing, etc.), when a pointer has been "taken" by another entity, etc. While this information might be identifiable from source code, much of this information is lost or obfuscated in resulting machine code. The emulation optimization metadata, therefore, preserves this information for later use by an emulator.

For example, many modern processors can execute individual machine code instructions at a given processing unit (core) in an order other than the order in which they were written by a software developer or, more typically, other than the order in which they were generated by a compiler from source code. Such "out of order" execution enables a processor to more fully utilize its internal processing unit resources (e.g., execution units), which are often highly parallelized. For example, if two (or more) machine code instructions in a given code stream are not dependent on each other, a single processing unit may be able to execute these instructions in parallel, rather than idly waiting for one instruction to complete prior to serially executing the next. To enable memory operations to be re-ordered while preserving correctness, modern processors and programming languages employ "memory models" that define how memory effects are globally visible in a multi-processor/multi-threaded environment. In particular, memory models define how multiple threads can interact through shared memory, including how they can access shared data. Thus, a memory model defines what types of out-of-order cross-thread memory observations are legal when executing multiple threads.

Out-of-order execution can be applied to many types of machine code instructions, including instructions that perform memory operations (i.e., operations that read from or write to a memory hierarchy, typically including one or more caches and system memory). Due to out-of-order execution and/or memory hierarchy design, memory accessing operations executing at one processing unit may be perceived by another processing unit (or another processor) as occurring in a different order than that prescribed in the original stream of machine code instructions. Many programming languages and/or compilers, therefore, enable software developers to specify memory ordering constraints (e.g., memory barriers, acquire/release semantics, etc.), memory volatility, and the like, through annotations to specific locations in source code. Such annotations prevent many compiler optimizations, such as eliding a corresponding memory access, re-ordering the memory access relative to any other memory access, assuming invariance and hoisting the memory access out of a loop, etc. In the specific example of the C/C++ languages/compilers, for example, such annotations could include adding the keyword 'volatile' to a type, variable definition, and/or memory access. Some compilers also provide custom intrinsic functions, such as '_ReadWriteBarrier' in MICROSOFT'S VISUAL C++ compiler, which—when included in source code—prevent the compiler from re-ordering memory accesses around the function call, irrespective of volatility.

When emitting machine code instructions for given processor instruction set architecture (ISA) a compiler might rely heavily that ISA's memory model to guarantee that these developer-specified memory ordering constraints are honored. For example, when compiling source code with a strongly-ordered ISA as the target (e.g., such as the x86 and x86-64 families of processor ISAs from INTEL and ADVANCED MICRO DEVICES ("AMD") in which every memory load comes with an implicit acquire semantic and every memory store comes with and implicit release semantic), it is often sufficient for the compiler to place the generated memory-accessing machine code instructions in the same order as in the source code, and rely on the implicit acquire and release semantics of the generated machine code instructions to guarantee the developer-specified memory ordering constraints. However, while these machine code instructions honor the developer-specified behaviors from the source code, these behaviors are not readily recognizable from and/or may not actually be implied in the generated machine code instructions, themselves. As such, there can be a loss of information relating to certain source code behaviors when the source code is translated to machine code. In embodiments, a compiler can generate emulation optimization metadata that preserves a record of these behaviors.

In addition, compilers operate within physical constraints of the target processor (e.g., availability of registers and/or availability of processor instructions, depending on the target processor ISA and/or processor model/generation within a given ISA) and within artificially-imposed constraints (e.g., compiler implementation choices, compiler optimization choices, available computing resources during compilation, target processor model/generation, etc.). These constraints can affect the machine code that is output of the compiler. As such, the compiler might generate very different sets of machine code from the same source code, each of which honors the behaviors that were expressed in the source code, given different physically and/or artificially-imposed constraints.

One example of an optimization that can be performed during binary emulation—based on source code behaviors obtained from compiler-generated emulation optimization metadata—is to combine memory accesses that are coalesce-able into a single memory access according to the source code's language memory model. Other example emulator optimizations can include pinning frequently requested memory (e.g. corresponding to stack variables) into a cache (e.g., L1) to avoid going to memory for those accesses; using available registers, such as advanced vector extensions ("AVX") registers, to store data from coalesce-able memory accesses; not treating a function call as an acquire and/or release barrier; coalescing memory accesses to the same cache line; grouping all of the validation of cache values against system memory for stack data before and/or after function calls together, etc.

Embodiments can also record bit-accurate traces while performing binary emulation of machine code that has been augmented with compiler-generated emulation optimization metadata. These bit-accurate traces are equivalent to a bit-accurate trace that would have been recorded based on execution this same machine code directly at a processor. In embodiments, a tracer might also leverage the emulation optimization metadata to further reduce the size of these equivalent bit-accurate traces.

For a given sequence of machine code instructions and inputs and outputs to those instructions there can be more than one valid way to capture execution of those instructions into a bit-accurate trace. In this description and the following claims, a bit-accurate trace is "equivalent" to another trace if, when those traces are replayed, they would produce exactly the same sequence of instructions with exactly the same set of inputs and outputs on each of those instructions. To illustrate, suppose that machine code reads a memory location three times, and it reads the same value each for each of those three reads. One trace of execution of that machine code might store information for the first read, while relying on that fact that the other two reads implicitly read the same value. An equivalent trace of that same machine code might store information for the first and third reads while the second read is inferred from the first, while another equivalent trace might store information for the first and second reads while the third read is inferred, etc.

In addition to inherent the benefits afforded by performing bit-accurate tracing when doing binary emulation in reliance on compiler-generated emulation optimization metadata, bit-accurate tracing might also directly leverage this compiler-generated emulation optimization metadata in order to improve tracing performance and/or to decrease trace size. For example, a tracer might use such metadata to perform fewer checks on memory accesses that are coalesce-able into a single memory according to the source code's language memory model, to reduce a number of memory accesses by re-order them to perform consistency checks (i.e., with system memory) together, to avoid recording execution of individual instructions of a function that relies only on its parameters, etc.

As will be recognized by one of ordinary skill in the art, and as will be described further herein, binary emulation and/or trace file generation that relies on compiler-generated emulation optimization metadata can result in a variety of technical improvements as compared to conventional binary emulation. For example, binary emulation that relies on compiler-generated emulation optimization metadata can improve the speed of binary emulation and/or can reduce the computing resources needed to carry out binary emulation. Combining such binary emulation with trace file generation reduces the overheads associated with performing bit-accurate tracing, opening up the situations in which the overheads associated with performing bit-accurate tracing might be acceptable. Furthermore, leveraging emulation optimization metadata can reduce resulting trace file size compared to conventional techniques, saving memory, disk space, and or network bandwidth.

To the accomplishment of the foregoing, FIG. 1 illustrates an example computing environment 100 that facilitates using metadata that preserves behaviors expressed in source code to efficiently emulate execution of machine code compiled from the source code, that can also facilitate recording this emulated execution to one or more bit-accurate traces. As depicted, computing environment 100 may comprise or utilize a special-purpose or general-purpose computer system 101 that includes computer hardware, such as, for example, one or more processors 102, system memory 103, and durable storage 104, which are communicatively coupled using one or more communications buses 107.

Embodiments within the scope of the present invention include physical and other computer-readable media for carrying or storing computer-executable instructions and/or data structures. Such computer-readable media can be any available media that can be accessed by the computer system. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the processors 102 to implement the disclosed functionality of the invention. Thus, for example, computer storage devices may include the depicted system memory 103 and/or the depicted durable storage 104, which can each store computer-executable instructions and/or data structures.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a network interface module (e.g., a "NIC"), and then eventually transferred to the system memory 103 and/or to less volatile computer storage devices (e.g., durable storage 104) at the computer system 101. Thus, it should be understood that computer storage devices can be included in computer system components that also (or even primarily) utilize transmission media.

Computer-executable instructions comprise, for example, instructions and data which, when executed at the one or more processors 102, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the durable storage 104 can store computer-executable instructions and/or data structures representing application programs such as, for example, an emulator 104a, a tracer 104b, and an application 104c (e.g., which could be a user-mode application and/or code that is executed in kernel mode). In general, the emulator 104a is usable to emulate execution of binary code (i.e., machine code instructions) of application 104c at an emulated processor while utilizing compiler-generated emulation optimization metadata 104d that is embedded in, or associated with, that binary code in order to decrease the amount of work it takes to emulate the execution of the binary code. The tracer 104b, if included, can record a bit-accurate trace of that emulated execution. This trace can be temporarily stored in system memory 103 (i.e., as shown as traces 103e), and can potentially be persisted to durable storage 104 (i.e., as shown as traces 104e).

The emulator 104a and the tracer 104b might each be a standalone application, might be integrated into the same application (such as a debugging suite), or might be integrated into another software component—such as an operating system kernel, a hypervisor, a cloud fabric, etc. As such, those skilled in the art will also appreciate that the invention may be practiced in cloud computing environments, such as to emulate and/or trace execution of an application 104c whose execution can be distributed across a plurality of computer systems. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Regardless of whether the embodiments herein operate at a single computer system 101 or across a plurality of computer systems, FIG. 1 details some of the components of each processor 102 that can be used to implement various embodiments described herein. As shown, each processor 102 can include (among other things) one or more processing units 105 (e.g., processor cores) and one or more caches 106. After loading code to be executed into system memory 103 (e.g., as shown by emulator 103a, tracer 103b, and application 103c/metadata 103d in system memory 103), each processing unit 105 loads and executes machine code instructions via the caches 106. During execution of these instructions at parallel execution units 105b, the instructions can use internal processor registers 105a as temporary storage locations and can read and write to various locations in system memory 103 via the caches 106 (e.g., using a "data" portion of the caches 106). If a processing unit 105 requires data (e.g., code or application runtime data) not already stored in the caches 106, then the processing unit 105 can initiate a "cache miss," causing the needed data to be fetched from the system memory 103 and stored in the caches 106—while potentially "evicting" some other data from the caches 106 back to system memory 103.

Generally, the caches 106 comprise a plurality of "cache lines," each of which stores a chunk of memory from a backing store, such a system memory 103. For example, FIG. 1 symbolically illustrates the caches 106 using a table 106a, in which each row (i.e., cache line) in the table 106a stores at least an address and a value. The address might refer to a location (e.g., a memory cell) in system memory 103. The address might be a physical address (e.g., the actual physical location in the system memory 103), or address might be a virtual address (e.g., an address that is mapped to the physical address to provide an abstraction). Virtual addresses could be used, for example, to facilitate memory isolation between different processes executing at the processors 102.

In embodiments, the traces 103e/104e are recorded based, at least in part, on utilizing a processor cache (e.g., hardware caches such as caches 106, emulated caches, etc.) to record the data that was read by the machine code instructions of a subject application. These embodiments are built upon an observation that processors (e.g., such as processor 102, or an emulated processor) form a semi- or quasi-closed system. For example, once portions of data for a given thread (i.e., code data and runtime application data) of the subject application (e.g., application 104c) are loaded into the processor's caches (e.g., caches 106), the processor can execute this thread by itself—without any external input—as a semi- or quasi-closed system for bursts of time. In particular, a processing unit (e.g., one of processing units 105) could execute one or more of the thread's machine code instructions from a code portion of the processor's caches, while using runtime data stored in a data portion of the processor's caches, and while using the processor's internal registers. When the processing unit needs some influx of information (e.g., because a machine code instruction is accessing (or will access) code or runtime data that is not already in the processor's caches or that is stored in uncacheable memory, because additional machine code instruction(s) are needed, etc.), the processing unit can trigger a cache miss to cause that information to be brought into the processor's caches from system memory or perform an uncached read. The processing unit can then continue executing one or more additional machine code instructions using the new information until new information is again needed (e.g., due to a read to data not already in the caches, due to a read from uncacheable memory, etc.). A bit-accurate representation of execution of a given thread can therefore be recorded based, in part, on recording data (e.g., relating to the thread's cache misses and uncached reads) that is sufficient to reproduce any data that was read by the thread's machine code instructions during their execution. This trace data can then be used to as input to the thread's machine code instructions in order to replay the original execution of the thread.

As mentioned, the emulator 104a can emulate execution of binary code of application 104c at an emulated processor while utilizing compiler-generated emulation optimization metadata 104d that is embedded in, or associated with, that binary code. This metadata 104d is generated by a compiler (e.g., a static compiler, a just-in-time compiler, etc.) during compilation of source code to machine code instructions, and captures behaviors of the source code that can be lost, or at least obfuscated, in the machine code instructions. For example, as mentioned, these behaviors can be any type of information that is available to a compiler at compile time, such as variable dependencies, memory ordering constraints (e.g., memory barriers, acquire/release semantics, etc.), volatility of memory locations, attributes of code sections (e.g., whether a function depends only on its parameters, whether a function relies on aliasing, etc.), when a pointer has been "taken" by another entity, and the like.

Figure 2:
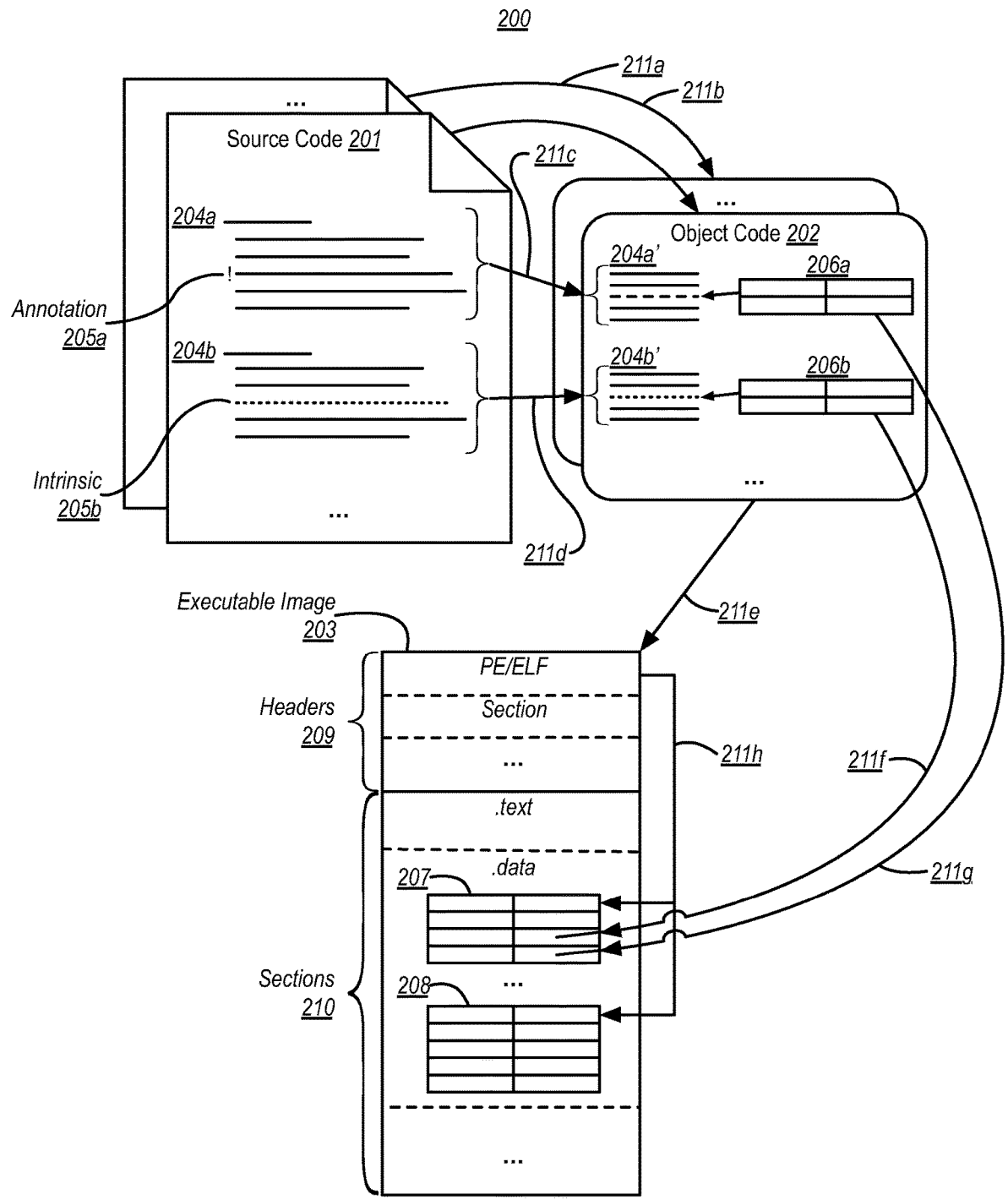
FIG. 2 illustrates an example of generating and preserving emulation optimization metadata during code compilation.

FIG. 2 illustrates an example 200 of generating and preserving emulation optimization metadata 104d during code compilation. In example 200, this metadata is specific to memory ordering constraints, but of ordinary skill in the art will recognize that similar, or additional, techniques could be used to preserve practically any type of source code behavior. While this metadata 104d could be stored in any file or data structure associated with an output binary, example 200 presents an embodiment in which the metadata 104d is stored within the output binary, itself. FIG. 2 shows just one example 200 of how emulation optimization metadata could be generated and preserved, and it will be recognized that there many other ways in which a particular implementation of the embodiments herein could generate and preserve emulation optimization metadata.

In general, FIG. 2 depicts one or more input source code files 201 (referred to as source code 201) that are an input to a compiler toolchain, one or more intermediary object code files 202 (referred to as object code 202) that are generated by the compiler toolchain from the source code 201, and an output executable image 203 that is generated by the compiler toolchain from the object code 202. FIG. 2 symbolically represents two functions 204a and 204b within the source code 201. Within these functions 204a, 204b, FIG. 2 symbolically represents some express developer-specified behaviors in the source code (though embodiments can also identify more inherent source code behaviors). These express developer-specified behaviors include an annotation 205a (e.g., an annotation keyword, such as 'volatile' in C/C++) that is symbolically represented in FIG. 2 as an explanation point, and an intrinsic 205b (e.g., an intrinsic function call, such as '_ReadWriteBarrier' in VISUAL C++) that is symbolically represented in FIG. 2 as a short-dashed line of source code. Both annotation 205a and intrinsic 205b represent developer-specified intended memory ordering constraints. For example, annotation 205a might define an ordering constraint on one or more corresponding source code statements, while intrinsic 205b might define an ordering constraint on one or more source code statements following the intrinsic.

As shown by arrows 211a and 211b, the compiler toolchain generates object code 202 from the source code 201 (e.g., one object code file for each source code file). Arrow 211c shows that compiler toolchain can generate a block 204a' of machine code instructions from the source code of function 204a, and arrow 211d shows that compiler toolchain can also generate a block 204b' of machine code instructions from the source code of function 204b. In embodiments, these machine code instructions are represented within object code 202 symbolically, such as by using offsets from the beginning of each block (i.e., corresponding to the beginning of each function). The long-dashed line within block 204a' represents a particular machine code instruction that was generated from the source code statement(s) corresponding to annotation 205a. The short-dashed line within block 204b', on the other hand, represents a particular instruction that is a no-op/pseudo-instruction that was generated from the intrinsic 205b.

Object code 202 also includes two data structures 206a and 206b. These data structures are shown in FIG. 2 as tables, though they could take any appropriate data structure format. These data structures 206a, 206b represent metadata generated by the compiler toolchain for each block 204a', 204b' of machine code instructions. As shown, data structure 206a includes a metadata portion that references the long-dashed machine code instruction in block 204a', while data structure 206b includes a metadata portion that references the short-dashed machine code instruction in block 204a'.

In embodiments, data structures 206a, 206b can be viewed as comprising memory ordering metadata, and are thus referred to herein as "memory ordering tables." In embodiments, these memory ordering tables contain entries that each identify a machine code instruction by its offset. These memory ordering tables might also identify a particular type of memory ordering constraint, such as a read barrier, a write barrier, or a read/write barrier. In some embodiments, the type of memory ordering constraint could even be omitted, with each entry being treated as a read/write barrier.

As shown by arrow 211e, the compiler toolchain an generates executable image 203 from the object code 202. As depicted, the executable image 203 might include headers 203 and different sections 210. For example, executable image 203 might contain a PE or ELF header, a section header, etc. Executable image 203 might also contain a .text section, a .data section, etc. Notably, the headers 209 and the sections 210 need not occur in the order depicted and could be interspersed. In implementations, one or more of the headers 203 (e.g., the section header) can identify the available sections 210 and specify how these sections are to be loaded into memory for execution. In implementations, the .text section can comprise the machine code instructions from the various object code files 202, with these instructions now being referenced by instruction memory address. The .data section, on the other hand, can comprise program data such as variable values, constants, and other data used by the machine code instructions.

As shown by arrows 211f and 211g, in example 200 the data structures 206a, 206b from the object code 202 are combined and inserted into one or more of the executable image's sections 210. For instance, in the example 200 of FIG. 2, data structure 207 (which aggregates data structures 206a, 206b) is shown in the executable image's .data section. Implementations may choose to include emulation optimization metadata within a variety of one or more sections of an executable image. For example, use of a .data section (as in FIG. 2) may be beneficial for data availability (i.e., the metadata might load and stay resident in memory, even the original target architecture), but the metadata then occupies memory even on machines that don't actually utilize the metadata. To reduce memory usage, alternative implementations might choose a section that is discarded by the original target architecture's binary loader, to thus reclaim the memory space of occupied by the emulation optimization metadata.

Data structure 207 can be viewed as a memory ordering table that contains the aggregate of the memory ordering tables from the object code 202. Similar to the tables discussed above in connection with the object code 202, each entry in data structure 207 might identify a particular type of memory ordering constraint, such as a read barrier, a write barrier, or a read/write barrier. In implementations, the entries in data structure 207 reference corresponding machine code instruction by instruction memory address. As shown by arrow 211h data structure 207 might be identified by one or more of the headers 209.

Executable image 203 could include additional emulation optimization metadata generated by the compiler toolchain. For example, FIG. 2 also illustrates data structure 208 within executable image 203. In embodiments, data structure 208 comprises instruction memory address range information, and thus could be viewed as a "range table." In particular, data structure 208 can identify which range(s) of memory addresses are covered by the machine code instructions that were generated by a compiler that also creates emulation optimization metadata. As shown by arrow 211h data structure 208 might also be identified by one or more of the headers 209.

Data structure 208 can be useful when executable image 203 contains machine code instructions that originate from sources other than object code 202, such as from statically-linked shared libraries. In these situations, data structure 208 can be used by a binary emulator to determine, for each instruction memory address, whether corresponding emulation optimization metadata is available for that instruction memory address. If a given instruction memory address is covered by a range specified in data structure 208, then the binary emulator might proceed to query data structure 207. Otherwise, if the instruction memory address is not covered by a range specified in data structure 208, then the binary emulator might determine no emulation optimization metadata is available for that address and thus pessimistically emulate memory barriers as appropriate.

Notably, some embodiments could indicate (either explicitly or implicitly) that one or more blocks of one or more machine code instructions lack corresponding emulation optimization metadata (e.g., such as data structure(s) 206a, 206b, and/or data structure 207). These indications could be present during any phase of the compilation, such as in object files and/or in the resulting executable image. These indications could be made, for example, using no-op/pseudo instructions, additional metadata stored within object code and/or in the resulting executable image, etc. These indications could be helpful, for example, to avoid searches for emulation optimization metadata during code emulation, and/or to ensure that an emulator treats these block(s) of instruction(s) pessimistically—such as by treating them as memory barriers.

Figure 3:
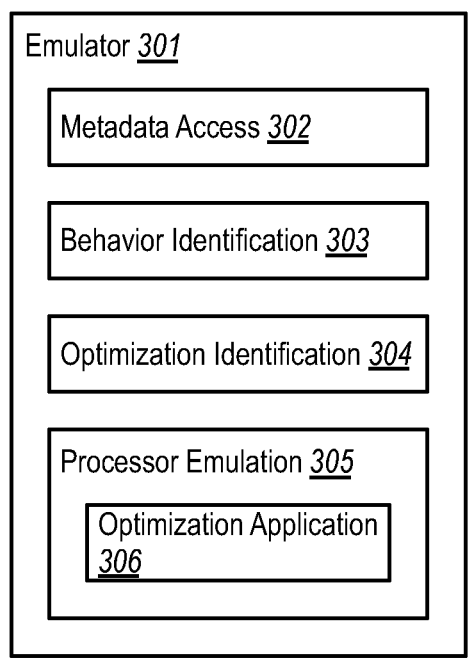
FIG. 3 illustrates an example of an emulator that can be used to perform binary emulation in a manner that leverage emulation optimization metadata during binary emulation.

FIG. 3 illustrates an example 300 of an emulator 301 (e.g., corresponding to emulator 104a of FIG. 1) that can be used to perform binary emulation (e.g., of application 104c) in a manner that leverages emulation optimization metadata (e.g., metadata 104d) during binary emulation. As depicted, the emulator 301 includes a variety of components (e.g., metadata access 302, behavior identification 303, optimization identification 304, processor emulation 305, optimization application 306, etc.) that represent various functionality the emulator 301 might implement in accordance with various embodiments described herein. It will be appreciated that these components—including their identity and arrangement—are depicted merely as an aid in describing various embodiments of the emulator 301 described herein, and that these components are non-limiting to how software and/or hardware might implement various embodiments of the emulator 301 described herein, or of the particular functionality thereof.

The metadata access component 302 accesses compiler-generated metadata associated with machine code that is being emulated by the emulator 300. For example, if application 104c were to include executable image 203 of FIG. 2, the metadata access component 302 might access metadata 104d that includes the data structures 207, 208 described in connection with FIG. 2, or any other appropriate compiler-generated metadata. As mentioned, this metadata could record any type of information, including source code behaviors, that were known at compile time and that might be useful to be aware of during emulation.

Based on the metadata accessed by the metadata access component 302, the behavior identification component 303 identifies one or more behaviors of the source code from which the machine code is compiled, but which may not be implied in the machine code (or which, at the very least, are obfuscated or not readily identified in the machine code that is being emulated). These behaviors could include, for example, variable dependencies, memory ordering constraints (e.g., memory barriers, acquire/release semantics, etc.), memory volatility, function-level metadata (e.g., whether a function depends only on its parameters, whether the function relies on aliasing), whether a pointer has been "taken" by another entity, and the like. In some embodiments, metadata 104d could even expressly specifically identify things that could be elided in an emulator. For example, the metadata 104d could identify processor flags that are not relied upon. While a physical processor inherently calculates its flags during normal operation, a software emulator does extra work calculate and maintain them. There can, therefore, be potentially significant savings for an emulator if it can avoid calculating/maintaining flags that are not consumed.

Based on the behavior(s) identified by the behavior identification component 303, the optimization identification component 304 identifies one or more emulator optimizations that can be applied during emulation of the subject machine code. In general, these optimizations reduce a number of steps needed to emulate execution of the machine code as part of a thread, while achieve the equivalent results of having executed the machine code at a processor directly, or of having emulated the machine code without using these optimizations. In general, this can include preserving any side-effects that are visible external to the thread and that are meaningful according to the original source code and the language memory model of the source code, even if these side-effects might deviate from the behavior that would have been seen had the optimizations not been applied. These emulator optimizations can either reduce the number of emulator operations needed emulate execution of one or more machine code instructions, or elide one or more machine code instructions from emulation altogether.

For example, suppose that the behavior identification component 303 identified from the metadata 104d that two or more memory locations (e.g., corresponding to variables or data structures) are dependent on one another. With this knowledge, the optimization identification component 304 might be able to identify ways to re-order emulation of one or more machine code instructions (e.g., resulting in fewer memory accesses). This may be possible because compilers often generate machine code instructions that re-order operations in a manner that keeps a processing unit's 105 execution units 105b busy, but that order may not be the most efficient for an emulator—which may not be constrained by physical limits of a processor such as a fixed number of available processor registers. With knowledge of dependencies, the optimization identification component 304 might even be able to identify ways to eliminate execution of one or more machine code instructions altogether. For example, if—based on the knowledge of data dependencies—the optimization identification component 304 can identify data on which nothing else depends, one or more operations might be able to be eliminated completely. For example, a compiler may generate instructions in the general code path whose outputs are used in only some code paths, depending on the outcomes of branches/conditions. Compilers may do this because, when this code is executed at a hardware processor, the extra runtime execution costs when the outputs of these instructions are not used is smaller than the runtime execution gains from having pre-calculated the output values when the data is needed. An emulator can change enough of the performance characteristics of the code's execution (e.g., including an ability to run instructions concurrently, to speculate, etc.), that when running this code on an emulator the negative costs may outweigh the gains. As such, an emulator may elide such instructions from the general code path.

As another example, suppose that the behavior identification component 303 identified from the metadata 104d one or more specific memory barriers. Using knowledge of memory barriers, the optimization identification component 304 might be able to identify memory reads and/or memory writes that can be elided entirely. In particular, multiple writes to the same memory location might be able to be consolidated into one if all of them happen before the same release barrier (i.e., eliminating all but one of the writes). Similarly, multiple reads to the same memory location might be able to be consolidated into one if all of them happen after the same acquire barrier.

As another example, suppose that the behavior identification component 303 identified from the metadata 104*d* function-level information for one or more functions. For example, the metadata 104*d* might have identified that a particular function depends only on its parameters. In this case, the optimization identification component 304 might be able to identify a way to use registers instead of memory for any local variables within that function, or might even be able to identify a native function with the same behavior that can be invoked rather than emulating the function. Additionally, or alternatively, the metadata 104*d* might have identified that a particular function does not rely on memory aliasing. In this case, the emulator 301 may not need to guarantee that data is accessible by memory address or similar alias, and the optimization identification component 304 may therefore be able to identify a place to relocate the data (e.g., a register, some other scratch space available to the emulator, etc.) that can be accessed more efficiently by the emulator 301. Additionally, or alternatively, the metadata 104*d* might have identified that a particular function that does not, itself, use memory barriers. In general, the emulator 301 might treat calls to functions as memory barriers, limiting available emulator optimizations around the call. However, if the metadata 104*d* indicates that this is not the case for a given function, the optimization identification component 304 might be able to identify ways to carry out reads and writes within a function more efficiently, such as by avoiding going all the way to memory for the reads/writes.

As another example, suppose that the behavior identification component 303 identified from the metadata 104*d* whether or not an entity has had a memory pointer to that entity "taken" by another entity. If so, the entity is alias-able, so the emulator 301 may need to be careful to not put the entity's data in a place where aliasing is not supported. Otherwise, if an entity's memory pointer isn't (or can't be) aliased, then optimization identification component 304 might be able to identify a way to store the entity's data into a location that is fast (e.g. scratch space in the emulated processor) instead of a memory location, if that is advantageous.

Other example optimizations might coalesce registers, pin frequently requested memory into a cache, use AVX registers to store data from coalesce-able memory accesses, coalesce memory accesses to the same cache line, group all of the validation of cache values against system memory for stack data before and/or after function calls together, and the like.

The processor emulation component 305 emulates execution of the subject machine code at a software-emulated processor. During this emulation, the optimization application component 306 applies the optimizations identified by the optimization identification component 304. As discussed, these optimizations can operate to reduce the number of emulator operations needed emulate execution of the subject code instructions while preserving external side-effects, or might elide machine code from emulation altogether.

Figure 4:
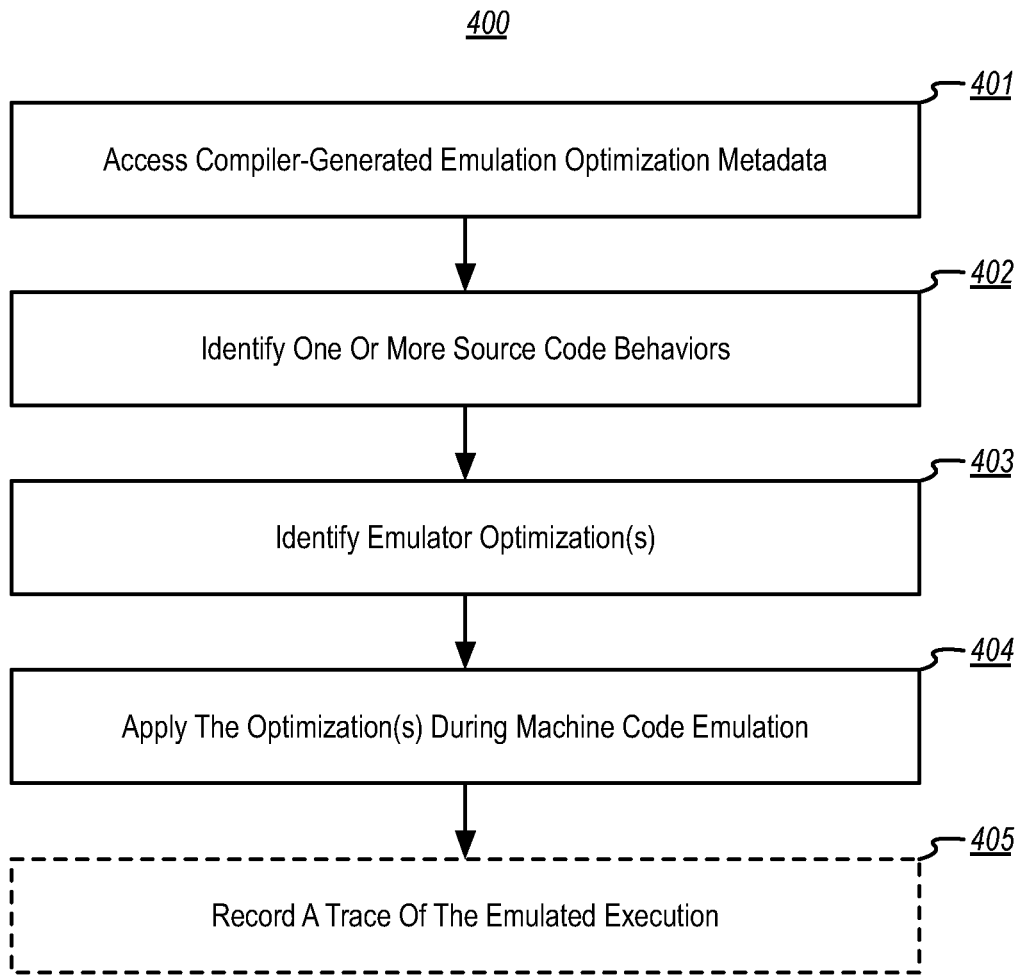
FIG. 4 illustrates a flow chart of an example method for using metadata that preserves behaviors expressed in source code to efficiently emulate execution of machine code compiled from the source code.

In view of the foregoing, FIG. 4 illustrates a flowchart of an example method 400 of using metadata that preserves behaviors expressed in source code to efficiently emulate execution of machine code compiled from the source code.

Method 400 will now be described in view of the architectures, components, and examples of FIGS. 1-3.

As shown in FIG. 4, method 400 includes an act 401 of accessing compiler-generated emulation optimization metadata. In some embodiments, act 401 comprises accessing compiler metadata associated with executable machine code that executes as part of a thread. For example, based on emulating execution of application 104*d*, the metadata access component 303 can access metadata 104*d*. Metadata can preserve any type information that was available to a compiler that compiled the application 104*c*, and which might be useful to improve emulation performance. As discussed, this can include information such as variable dependencies, memory ordering constraints, memory volatility, function-level metadata, whether a pointer has been "taken" by another entity, and the like.

Method 400 also includes an act 402 of identifying one or more source code behaviors. In some embodiments, act 402 comprises identifying one or more behaviors of the source code from which the machine code is compiled which are not implied by the machine code. For example, the behavior identification component 304 can identify any behaviors (e.g., such as variable dependencies, memory ordering constraints, memory volatility, function-level metadata, whether a pointer has been "taken" by another entity, etc.) that were preserved in the metadata 104*d*. As noted, these behaviors may not expressly be identified in the machine code, and/or may be difficult to determine from the machine code. For example, a compiler may have relied on behaviors in a target ISA (e.g., acquire/release semantics) that are not expressly identified in the executable code to enforce a source code behavior. In addition, the machine code may imply a behavior (such as one guaranteed by the target ISA), that did not actually exist in the source code.

Method 400 also includes an act 403 of identifying emulator optimization(s). In some embodiments, act 403 comprises identifying one or more emulator optimizations that can be applied during emulation of execution of the thread that reduce a number of steps needed to emulate execution of one or more machine code instructions of the machine code. This can be done while preserving one or more side-effects of execution of one or more machine code instructions that are visible external to the thread. These emulator optimizations can include at least one of (i) reducing a number of emulator operations needed emulate execution of the one or more machine code instructions, or (ii) eliding one or more machine code instructions from emulation. For example, based on the behaviors identified in act 402, the optimization identification component 305 can identify emulator optimizations/shortcuts that can be taken to emulate the code of application 104*c*, while producing the equivalent results of having executed the application 104*c* at processor(s) 102, or of having not made the emulator optimizations/shortcuts. As a result, the externally-visible side-effects of executing each thread are meaningful according to the original source code and the language memory model of the source code, even if these side-effects might deviate from the behavior that would have been seen if the optimizations/shortcuts were not taken. As discussed in connection with the optimization identification component 304, these optimizations/shortcuts can include such things as re-ordering memory accesses, coalescing reads and/or writes around memory barriers, using registers or other emulator scratch space instead of going to memory, pinning frequently requested memory into a cache, etc. The result of these optimizations/shortcuts is to emulate code of application 104*c* using fewer emulator steps than would be otherwise required, including potentially omitting emulation of some of the code of application 104c altogether.

Method 400 also includes an act 404 of applying the optimization(s) during machine code emulation. In some embodiments, act 404 comprises, while emulating execution of the machine code as part of emulating execution of the thread, applying the one or more emulator optimizations to at least (i) reduce the number of emulator operations needed emulate execution of the one or more machine code instructions while preserving the one or more side-effects, or (ii) elide the one or more machine code instructions from emulation while preserving the one or more side-effects. For example, while the processor emulation component 305 emulates code of application 104c, the optimization application component 306 can apply the optimizations/shortcuts that were identified in act 404.

In view of the discussion above, these optimizations could include, for example, eliding one or more memory accesses when a function depends only on its inputs, or when the function does not incur aliasing; relocating data from memory to a register when a function does not rely on aliasing; avoiding going to memory for one or more reads or one or more writes when a function does not use memory barriers; coalescing a plurality of memory reads to the same memory address after the same acquire barrier; coalescing a plurality of memory writes to the same memory address before the same release barrier; re-ordering emulation of one or more machine code instructions or eliding at least one machine code instruction based on variable dependencies; refraining from calculating the flag; refraining from storing an entity's data in memory if the entity cannot be aliased; etc.

As mentioned, embodiments can also record bit-accurate traces while performing binary emulation of machine code that has been augmented with compiler-generated emulation optimization metadata. As such, method 400 might also include an act 405 of recording a trace of the emulated execution. In some embodiments, act 405 comprises based at least on emulating execution of the machine code, recording a trace usable to replay the emulated execution of the machine code. For example, while the emulator 104a emulates execution of application 104d using metadata 104d, the tracer 104b can record a bit-accurate trace of that emulated execution to the traces 103e/104e. Because the emulator 104a the equivalent results of having executed application 104c without emulation optimizations/shortcuts, this trace can be equivalent to a trace that was recorded without applying the emulator optimizations.

In embodiments, the tracer 104b could also leverage the metadata 104d directly to reduce trace size. For example, the tracer 104b might use such metadata 104d to perform fewer checks on memory accesses that are coalesce-able into a single memory according to the source code's language memory model, or to reduce a number of memory accesses by re-order them to perform consistency checks (i.e., with system memory) together. In another example, if the metadata 104d indicates that a function relies only on its parameters, the tracer 104b might be able to record only the inputs to the function—and avoid recording execution of the instructions within this function. With the function's code being available (i.e., in the application binary, or injected into the trace at record time), the function can be fully replayed by providing the appropriate machine code with these function inputs.

Notably, performing emulation optimizations/shortcuts might potentially obfuscate the occurrence of race conditions during emulation (e.g., such as by changing the probability of the race condition happening). However, if a trace of the emulation was recorded in act 405, it is possible to identify these race conditions from the trace (e.g., by analyzing the trace to find two or more non-synchronized accesses to the same memory location that happen across threads, and in which one or more of the memory accesses is a write).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for using metadata that preserves behaviors expressed in source code to efficiently emulate execution of machine code compiled from the source code, the method comprising:

based on accessing compiler metadata associated with executable machine code that executes as part of a thread, identifying one or more behaviors of the source code from which the machine code is compiled which are not implied by the machine code;

based on the identified one or more behaviors of the source code from which the machine code is compiled, identifying one or more emulator optimizations that can be applied during emulation of execution of the thread that reduce a number of steps needed to emulate execution of one or more machine code instructions of the machine code while preserving one or more side-effects that are visible external to the thread, the one or more emulator optimizations including at least one of (i) reducing a number of emulator operations needed to emulate execution of the one or more machine code instructions, or (ii) eliding the one or more machine code instructions from emulation; and while emulating execution of the machine code as part of emulating execution of the thread, applying the one or more emulator optimizations to at least (i) reduce the number of emulator operations needed to emulate execution of the one or more machine code instructions while preserving the one or more side-effects, or (ii) elide the one or more machine code instructions from emulation while preserving the one or more side-effects.

2. The method of claim 1, further comprising, based at least on emulating execution of the machine code, recording a trace usable to replay the emulated execution of the machine code, the trace being equivalent to a trace recorded without applying the one or more emulator optimizations.

3. The method of claim 1, wherein preserving the one or more side-effects comprises preserving one or more external memory behaviors that are meaningful according to the source code and according to a language memory model of the source code.

4. The method of claim 1, wherein the one or more behaviors identify that a function depends only on its inputs or that the function does not incur aliasing, and wherein the one or more emulator optimizations elide one or more memory accesses during execution of machine code corresponding to the function.

5. The method of claim 1, wherein the one or more behaviors identify that a function does not rely on aliasing, and wherein the one or more emulator optimizations relocate data from a memory to a register.

6. The method of claim 1, wherein the one or more behaviors identify that a function does not use memory barriers, and wherein the one or more emulator optimizations avoid going to a memory for one or more reads or one or more writes.

7. The method of claim 1, wherein the one or more behaviors identify an acquire barrier, and wherein the one or more emulator optimizations coalesce a plurality of memory reads to the same memory address after the acquire barrier.

8. The method of claim 1, wherein the one or more behaviors identify a release barrier, and wherein the one or more emulator optimizations coalesce a plurality of memory writes to the same memory address before the release barrier.

9. The method of claim 1, wherein the one or more behaviors identify one or more variable dependencies, and wherein the one or more emulator optimizations re-order emulation of one or more machine code instructions or elide at least one machine code instruction.

10. The method of claim 1, wherein the one or more behaviors identify a flag that can be elided, and wherein the one or more emulator optimizations refrain from calculating the flag.

11. The method of claim 1, wherein the one or more behaviors identify an entity that cannot be aliased, and wherein the one or more emulator optimizations refrain from storing the entity's data in a memory.

12. A computer system, comprising:
   one or more processors; and
   one or more computer-readable media having stored thereon computer-executable instructions that are executable by the one or more processors to cause the computer system to perform at least the following:
   based on accessing compiler metadata associated with executable machine code that executes as part of a thread, identify one or more behaviors of the source code from which the machine code is compiled which are not implied by the machine code;
   based on the identified one or more behaviors of the source code from which the machine code is compiled, identify one or more emulator optimizations that can be applied during emulation of execution of the thread that reduce a number of steps needed to emulate execution of one or more machine code instructions of the machine code while preserving one or more side-effects that are visible external to the thread, the one or more emulator optimizations including at least one of (i) reducing a number of emulator operations needed to emulate execution of the one or more machine code instructions, or (ii) eliding the one or more machine code instructions from emulation; and
   while emulating execution of the machine code as part of emulating execution of the thread, apply the one or more emulator optimizations to at least (i) reduce the number of emulator operations needed to emulate execution of the one or more machine code instructions while preserving the one or more side-effects, or (ii) elide the one or more machine code instructions from emulation while preserving the one or more side-effects.

13. The computer system of claim 12, wherein the computer-executable instructions that are also executable by the one or more processors to cause the computer system to record a trace usable to replay the emulated execution of the machine code, the trace being equivalent to a trace recorded without applying the one or more emulator optimizations.

14. The computer system of claim 12, wherein preserving the one or more side-effects comprises preserving one or more external memory behaviors that are meaningful according to the source code and according to a language memory model of the source code.

15. The computer system of claim 12, wherein the one or more behaviors identify that a function depends only on its inputs or that the function does not incur aliasing, and wherein the one or more emulator optimizations elide one or more memory accesses during execution of machine code corresponding to the function.

16. The computer system of claim 12, wherein the one or more behaviors identify that a function does not rely on aliasing, and wherein the one or more emulator optimizations relocate data from a memory to a register.

17. The computer system of claim 12, wherein the one or more behaviors identify that a function does not use memory barriers, and wherein the one or more emulator optimizations avoid going to a memory for one or more reads or one or more writes.

18. The computer system of claim 12, wherein the one or more behaviors identify an acquire barrier, and wherein the one or more emulator optimizations coalesce a plurality of memory reads to the same memory address after the acquire barrier.

19. The computer system of claim 12, wherein the one or more behaviors identify a release barrier, and wherein the one or more emulator optimizations coalesce a plurality of memory writes to the same memory address before the release barrier.

20. A computer program product comprising one or more hardware storage devices having stored thereon computer-executable instructions that are executable by one or more processors to cause a computer system to perform at least the following:
   based on accessing compiler metadata associated with executable machine code that executes as part of a thread, identify one or more behaviors of the source code from which the machine code is compiled which are not implied by the machine code;
   based on the identified one or more behaviors of the source code from which the machine code is compiled, identify one or more emulator optimizations that can be applied during emulation of execution of the thread that reduce a number of steps needed to emulate execution of one or more machine code instructions of the machine code while preserving one or more side-effects that are visible external to the thread, the one or more emulator optimizations including at least one of (i) reducing a number of emulator operations needed to emulate execution of the one or more machine code instructions, or (ii) eliding the one or more machine code instructions from emulation; and
   while emulating execution of the machine code as part of emulating execution of the thread, apply the one or more emulator optimizations to at least (i) reduce the number of emulator operations needed to emulate execution of the one or more machine code instructions while preserving the one or more side-effects, or (ii) elide the one or more machine code instructions from emulation while preserving the one or more side-effects.

* * * * *